(12) United States Patent
Brevet et al.

(10) Patent No.: US 10,781,832 B2
(45) Date of Patent: Sep. 22, 2020

(54) MILKING ROBOT WITH CYLINDER SYSTEM

(71) Applicant: LELY PATENT N.V., Maassluis (NL)

(72) Inventors: Michiel Brevet, Maassluis (NL); Dirk Kraaij, Maassluis (NL); Gerard Mostert, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 143 days.

(21) Appl. No.: 15/780,727

(22) PCT Filed: Nov. 25, 2016

(86) PCT No.: PCT/NL2016/050828
§ 371 (c)(1),
(2) Date: Jun. 1, 2018

(87) PCT Pub. No.: WO2017/095222
PCT Pub. Date: Jun. 8, 2017

(65) Prior Publication Data
US 2018/0355894 A1 Dec. 13, 2018

(30) Foreign Application Priority Data
Dec. 4, 2015 (NL) ...................................... 2015908

(51) Int. Cl.
*A01J 5/00* (2006.01)
*F15B 21/00* (2006.01)
(Continued)

(52) U.S. Cl.
CPC ............ *F15B 21/006* (2013.01); *A01J 5/0175* (2013.01); *B25J 9/144* (2013.01); *F15B 15/149* (2013.01); *F15B 15/1428* (2013.01)

(58) Field of Classification Search
CPC ...... A01J 3/00; A01J 5/00; A01J 5/017; A01J 5/0175; A01J 7/00
(Continued)

(56) References Cited

U.S. PATENT DOCUMENTS

| | | | | |
|---|---|---|---|---|
| 4,586,462 A | * | 5/1986 | Icking | ..................... A01J 5/017 119/14.1 |
| 5,042,428 A | * | 8/1991 | Van der Lely | .......... G01S 17/42 119/14.08 |

(Continued)

FOREIGN PATENT DOCUMENTS

| | | |
|---|---|---|
| JP | 2005-282172 A | 10/2005 |
| NL | 263 017 A1 | 12/1988 |
| WO | WO 99/25177 A1 | 5/1999 |

OTHER PUBLICATIONS

International Search Report dated Mar. 21, 2017, in PCT/NL2016/050828 filed Nov. 25, 2016.

*Primary Examiner* — Richard T Price, Jr.
(74) *Attorney, Agent, or Firm* — Oblon, McClelland, Maier & Neustadt, L.L.P.

(57) ABSTRACT

A milking robot for the fully automatic milking of dairy animals includes at least one moving component and a cylinder configured to support a movement of the component. The cylinder has a cylinder wall having an aeration opening, as well as a cylinder rod slidable into and out of the cylinder. The cylinder wall surrounds at least one variable volume part, which volume part is free from pressure fluid connections for displacement of the cylinder rod. The cylinder is configured to remain, via the opening, substantially in pressure equilibrium with an environment of the cylinder. To the cylinder wall around the aeration opening is connected a gas collecting device which has a changeable volume and which, together with the variable volume part, (Continued)

forms an airtight gas volume. In addition, the gas collecting device has a minimum volume greater than zero.

<div align="center">20 Claims, 4 Drawing Sheets</div>

(51) Int. Cl.
    *A01J 5/017*      (2006.01)
    *B25J 9/14*      (2006.01)
    *F15B 15/14*      (2006.01)

(58) Field of Classification Search
    USPC ........... 119/14.01, 14.02, 14.1, 14.13, 14.18, 119/14.08
    See application file for complete search history.

(56) References Cited

<div align="center">U.S. PATENT DOCUMENTS</div>

| | | | |
|---|---|---|---|
| 6,386,141 B1 | 5/2002 | Forsen et al. | |
| 6,443,094 B1* | 9/2002 | DeWaard | A01J 7/04 119/14.18 |
| 8,286,583 B2* | 10/2012 | Van Den Berg | A01J 5/007 119/14.02 |
| 2007/0221055 A1 | 9/2007 | Dorval | |
| 2011/0114024 A1* | 5/2011 | Van Den Berg | A01J 5/0175 119/14.02 |
| 2014/0060436 A1* | 3/2014 | Krone | A01J 5/017 119/14.1 |
| 2018/0020631 A1* | 1/2018 | Hofman | F16B 1/00 119/14.02 |

\* cited by examiner

MILKING ROBOT WITH CYLINDER SYSTEM

The invention relates to a milking robot for the fully automatic milking of dairy animals, comprising at least one moving component and a cylinder configured to support a movement of the component, which cylinder has a cylinder wall having an aeration opening, as well as a cylinder rod slidable into and out of the cylinder, wherein the cylinder wall surrounds at least one variable volume part, which volume part is free from pressure fluid connections for displacement of the cylinder rod and, furthermore, is configured to remain, via said opening, substantially in pressure equilibrium with an environment of the cylinder, wherein to the cylinder wall around said aeration opening there is connected a gas collecting device, which has a changeable volume and which, together with the variable volume part, forms an airtight gas volume.

A milking robot of this type is described in the non-prepublished Patent Application NL2015356. A milking robot having a cylinder of this type has a retractable and extensible part, which can make said component move. As a result of said retraction and extension, the space in which the retractable and extensible part moves has a variable volume. If this variable volume is closed off from the outside world in an airtight manner, this might lead to unwanted pressure differences. If the variable volume is fluidically connected to the environment, dirt or moisture can be drawn in. Especially in a shed environment in which a milking robot is installed, a lot of dirt will be available, such as ammonia and other corrosive gases, as well as urine and droppings from dairy animals and flies, etc.

Cylinders of this type can be, for example, single-acting gas pressure cylinders. In the prior art, electric cylinders are also known, inter alia from the company Festo, in which a linear motor drives a reciprocating shaft. Upon the displacement of the piston rod, the internal volume of the cylinder changes and air can be compressed or drawn in. In all cases, a pressure difference arises with the outside world, which can lead to disturbance of a correct working of the cylinder and to leaking, along seals, of moisture, dust and corrosive substances such as ammonia, dung or urine, as these are present in a milking shed.

The milking device described in NL2015356 resolves this with a changeable volume which is connected to the cylinder wall and which can expand and contract with the displacement of gas from the cylinder, so that the whole remains (approximately) at ambient pressure. This device does not always work perfectly in practice, and it is an object of the invention to further improve said milking device.

The invention provides a milking robot according to claim 1, in particular a milking robot for the fully automatic milking of dairy animals, comprising at least one moving component and a cylinder configured to support a movement of the component, which cylinder has a cylinder wall having an aeration opening, as well as a cylinder rod slidable into and out of the cylinder, wherein the cylinder wall surrounds at least one variable volume part, which volume part is free from pressure fluid connections for displacement of the cylinder rod and, furthermore, is configured to remain, via said opening, substantially in pressure equilibrium with an environment of the cylinder, wherein to the cylinder wall around said aeration opening is connected a gas collecting device, which has a changeable volume and which, together with the variable volume part, forms an airtight gas volume, wherein the gas collecting device has a minimum volume greater than zero.

The invention herein makes use of the following insight. In practice, it cannot be precluded that a leakage occurs in the air volume, for example that of the gas collecting device. The volume of this gas collecting device will then be able to become smaller, especially if the gas pressure is at least somewhat above ambient pressure. The volume of the gas collecting device can then be very small, or even zero. If the cylinder were subsequently to change position, so that air or gas would then have to flow out of the gas collecting device in order to obtain pressure equalization, that is no longer possible. An underpressure is then created in the system (the cylinder, etc.), so that ambient air containing dust and the like can still penetrate the system along seals (O-rings, etc.) and other components. In fact, the old system for which NL2015356 offered a solution is then back to square one. The present invention resolves this by ensuring that the volume of the gas collecting device, in the event of a leak, can specifically not fall back to zero. Not only can the system comprising the cylinder and the gas collecting device then always exhaust that minimum volume, so that the lowest underpressure does not become too low. In the event that the leak is in the gas collecting device itself, it is also possible that air, via that leak, can continue to leak into the gas collecting device, whereby any underpressure at least at any rate rapidly becomes smaller and air is at any rate prevented from leaking elsewhere into the milking device. Of course, it is generally undesirable for air to leak in, but the invention ensures that any such leakage happens, at least as far as possible, in a controlled manner.

In the event that there is no leak, the advantages as described for NL2015356 will continue to apply in full. For example, by giving the cylinder, at least the variable volume part thereof, with the aid of the gas collecting device, a changeable volume, no unwanted build-up of overpressure or underpressure will occur, so that the correct working of the cylinder can be better ensured, both as regards the function itself and as regards a lesser contamination thereof. After all, no external air with associated contamination will have to be drawn in, because the system as a whole is closed. For example, it is possible to fill the cylinder, at least the variable volume part, with a harmless gas, such as (dry) air, nitrogen, argon, etc.

In the present invention, the gas collecting device has a minimum volume greater than zero. The minimum volume is in particular predetermined, so that a lowest underpressure can be calculated in advance, on the basis of the maximum volume change in the cylinder(s). Advantageously, the minimum volume is at least 10% of the airtight gas volume at ambient pressure. More advantageously, the minimum volume is at least 50%, and more advantageously at least 75%, of the maximum change in airtight gas volume at ambient pressure. This ensures a good balance between a compact device and a sufficiently limited underpressure.

By "substantially in pressure equilibrium" is meant in the present application that the pressure difference between the variable volume part or the gas collecting device on the one hand, and the environment on the other hand, is equal to or less than 0.2 bar, advantageously equal to or less than 0.1 bar, and more advantageously equal to or less than 0.05 bar. Of course, the environment will generally have the atmospheric pressure.

Note that a solution in which an airtight bellows is provided from the cylinder wall up to and including the retractable and extensible piston rod is often impractical. After all, a bellows of this type, upon each movement of the piston rod, is jointly expanded or compressed, more than is necessary to absorb a change in volume of the air.

The bellows will always have to inflate in order, at substantially constant pressure, to offer space to the displaced air. Certainly in the case of a robot arm, an increasing volume of one or more parts thereof will often be undesirable. Moreover, it is also possible to make in this bellows a deaeration opening, though this leads to not much more than the shifting of the deaeration problem. Note that a deaeration opening of this type is not consistent with an unplanned leak. Moreover, a deaeration opening would specifically standardly produce an inflow of air, while, in a non-leaking system according to the invention, there is no question at all of this.

Furthermore, in pneumatic cylinders, inter alia of Namur Breather Blocks of the company Habonim, it is known to collect spent compressed air or other gaseous pressure medium in order to make it available if a pressureless part of the cylinder has to be enlarged in volume. The excess of compressed air is then ventilated to the environment. Thus, inflowing of corrosive medium can also be prevented. Apart from the fact that Breather Blocks of this type are unnecessarily complex, with various valves and lines, there is still the danger that, slowly but surely, moisture, dust and the like can finds its way in. After all, medium is always being freshly supplied, which supply is still not guaranteed to be free from contaminations. After all, the medium must be supplied to the compressor which delivers the compressed air, and thus the medium still passes through one or more filters and pumps.

According to the invention, there is provided a wholly closed system, which, once filled with clean and dry gas, such as air or nitrogen or the like, remains in principle free from contamination. Should a leak still arise, then even then the inflow of air and dirt is still, where possible, controllable.

According to the invention, the gas collecting device is connected to the cylinder wall around said aeration opening. By this is meant that the gas collecting device extends as a closed wall around said aeration opening and on the cylinder wall. It is expressly precluded that the gas collecting device is connected as a bellows from cylinder wall to cylinder rod, since a bellows of this type will not be connected wholly around the aeration wall, but on one side specifically around the cylinder wall. Because, according to the present invention, the gas collecting device is connected around the aeration opening, it is now mechanically fully decoupled from movements of the cylinder rod and therefore does not boast the drawbacks which apply to a bellows of this type.

Moreover, in this application "cylinder rod" is used where, per se, "piston rod" is customary. Since electric cylinders do not necessarily require a piston, the more general term "cylinder rod" is here adopted, however, in order to indicate the retractable and extensible rod of the cylinder.

Advantageous embodiments of the invention will be given below, as well as in the following description of the figures. For example, it is still possible to install a bellows from the cylinder wall up to an always externally remaining part of the cylinder rod or the moving component connected thereto. This bellows can then move as a concertina without "inflating", that is to say without increasing in cross section, since the gas collecting device can collect an excess of gas. In this embodiment, not only is a gas exchange precluded, but also a contamination of especially the cylinder rod, via which possibly also dust could end up in the variable volume part. Nevertheless, for bellows of this type, the same drawbacks apply as have already been mentioned for the prior art. Moreover, it is noted that bellows of this type could also be in the way of control lines and pressure lines.

In some embodiments, the gas collecting device comprises an open-holding means for ensuring the minimum volume in the event of a pressure reduction in the gas collecting device. If the gas collecting device empties as a result of a leak therein, this open-holding means prevents a reduction in volume to below a minimum volume.

In particular, the open-holding means comprises at least one resilient element, in particular an open-cell block of plastics foam, a spring, and/or a volume which is closed off with a diaphragm and contains a gas. As a result of a resilient element of this type, a volume reduction to below the minimum volume can expediently be prevented. The resilient element is in this case advantageously located in the gas collecting device, where it is optimally shielded. It is also possible, however, to fit the resilient element on the outer side of the gas collecting device or in the structure of the gas collecting device itself, as a sort of (exo)skeleton. Furthermore, it is advisable that the resilient element is dimensioned such that the gas collecting device, without leak in its operating state with the smallest volume, does not yet compress the resilient element. This signifies that in normal operating state there is sufficient gas in the gas collecting device to prevent that the resilient element, during normal, leak-free operation of the milking device, is compressed. The element will then not at all, or scarcely, influence the normal operation.

It is here noted that the "block" of plastic can have any arbitrary shape, and does not necessarily have to be a (right or otherwise) parallelepiped or bar. Although the plastics foam does not necessarily have to be open-cell, this does offer advantages with respect to the transport of air through the block, especially, but not solely, in case of a leak. Furthermore, also a plurality of open-holding means, such as plurality of plastics blocks, can also in general be provided. This offers the advantage that the gas collecting device can at several places be arrested as regards excess deflation.

In attractive embodiments, the gas collecting device comprises a flexible gas collecting bag. A flexible gas collecting bag of this type is extremely suitable for absorbing the volume change without causing (strong) pressure fluctuations as a result of a high resistance. The gas collecting bag can be connected around said aeration opening directly, or via the above-stated tube or line, and can therefore be provided at a shielded place. But specifically a flexible gas collecting bag of this type can totally deflate when punctured. Thus the bag totally loses its function if a gas flow is demanded in the event of a volume enlargement further on in the system. As a result of the present invention, the gas collecting bag, even in the event of a leak, retains a minimum volume, and it is expediently protected against loss of function. A gas collecting bag of this type is not particularly limited and can be produced from all sorts of materials, such as plastic, leather, etc.

Alternatively or additionally, the gas collecting device comprises a collecting cylinder having a compressible piston, in particular having a stop in the piston at the minimum volume. The gas collecting device in this case comprises a collecting cylinder in floating state. The stop can then serve to ensure the minimum volume, although the stop can be provided in the form of a piston or the like. The collecting cylinder is connected, with a part which is closed off and is changeable in volume, to, for example, a tube or line, which in turn is connected around the aeration opening. Note that the other part of the collecting cylinder should be in open connection with the atmosphere or the environment, so that, in fact, the aeration problem is shifted to the collecting cylinder. The latter can be provided, however, at a cleaner place, so that the pollution with dust, aggressive agents and the like is much less. Moreover, it is alternatively possible to give the collecting cylinder a much larger volume than the variable volume part and then still to close it off in an airtight manner. Thus no gas exchange occurs, but the pressure difference in the variable volume part is nevertheless much smaller than without a collecting cylinder.

More generally, it would be possible to speak of a gas collecting device having an accumulator. A difference from an accumulator in, for example, a hydraulic system is not only that it is not the direct hydraulic pressure which compresses such an "accumulator", but also that the "accumulator" is not provided to absorb and "store" a higher pressure, but specifically to prevent the creation of too low a pressure. Thus in a normal system in the prior art, there is no reason to provide such an "accumulator".

In some embodiments, the gas collecting device is connected, with a tube or line around the aeration opening, in gas connection to the variable volume part. This offers the advantage that the actual gas collecting device can be provided at some distance from the cylinder, so that it will not obstruct movements of the cylinder and/or the moving component. The tube or line itself can then, for example, be made of a strong material, so that although no change of volume will occur therein, there is less chance of damage through movement of the moving component or the like.

In some embodiments, the gas collecting device comprises a flexible gas collecting bag or a collecting cylinder having a floating piston. A flexible gas collecting bag of this type is extremely suitable for absorbing the volume change without causing (strong) pressure fluctuations as a result of a high resistance. The gas collecting bag can be connected directly around said aeration opening or via the above-stated tube or line, and can therefore be provided at a shielded place. A gas collecting bag of this type is not particularly limited and can be produced from all sorts of materials, such as plastic, leather, etc. Alternatively or additionally, the gas collecting device comprises a collecting cylinder in floating state. The collecting cylinder is then, of course, connected, with a part which is closed off and is changeable in volume, to, for example, a tube or line, which in turn is connected around the aeration opening. Note that the other part of the collecting cylinder should be in open connection with the atmosphere or the environment, so that, in fact, the aeration problem is shifted to the collecting cylinder. The latter can be provided, however, at a cleaner place, so that the pollution with dust, aggressive agents and the like is much less. Moreover, it is alternatively possible to give the collecting cylinder a much larger volume than the variable volume part and then still to close it off in an airtight manner. Thus no gas exchange occurs, but the pressure difference in the variable volume part is nevertheless much smaller than without a collecting cylinder.

In some embodiments, the gas collecting bag is installed in a dimensionally rigid outer casing, in particular a tube of the milking robot. In this way, the gas collecting bag can be still better protected against damage from outside, such as through kicking or the like by dairy animals. Often a milking robot will comprise a control box or the like, or a frame in which the gas collecting bag can be accommodated in a simple and shielded manner.

In some embodiments, the gas collecting device has a volume which, by supplying of gas from the volume part of the cylinder, is changeable between a smallest and a largest volume, wherein a gas pressure in the gas collecting device, when the largest volume is assumed, is equal to or less than 2 bar. In particular, the gas pressure amounts to no more than substantially the ambient pressure. If the gas collecting device, for example the gas collecting bag, is sufficiently pliable, the pressure will substantially always be substantially the ambient pressure. Of course, at the smallest volume of the gas collecting device, the pressure will be substantially equal to the ambient pressure, or even somewhat lower.

In some embodiments, the cylinder is a pressure cylinder, such as a (hydro)pneumatic or hydraulic cylinder, which pressure cylinder comprises, in addition to the variable volume part, comprises a variable pressure volume part for receiving a pressure fluid such as oil or compressed air. These are common types of cylinder, which often have a long stroke when used in a milking robot. As a result, the displaced volumes of air or other gas will likewise often be large.

In some embodiments, the pressure cylinder is in particular a balance cylinder for supporting the weight of at least a part of the robot arm. By a balance cylinder is here meant a cylinder which standardly is pressurized, and supports the robot arm from below in order thereby to compensate some of the weight. As a result, the control system of the robot arm, that is to say the required actuator(s), can be made of lighter construction. A pressure cylinder of this type will often also boast a long stroke, and hence a relatively large displaced volume of gas.

In some embodiments, the milking robot comprises, in particular, a pneumatic, hydraulic or hydropneumatic drive, which is configured to transfer pressure fluid to or from the pressure volume part. Thus, also the one or more drives are provided for the one or more cylinders, for execution of the movements of the moving component. Moreover, alternative drives are also possible, as will become clear further on.

In some embodiments, between the variable volume part of the or each pressure cylinder, on the one hand, and the gas collecting device and variable volume part of every other said cylinder, is placed a filter, which is configured to filter gas which flows through it. Such a filter can be used should a leak occur in the pressure cylinder, wherein especially gas under pressure leaks from the pressure volume part to the variable volume part of the pressure cylinder, and from out of there to the gas collecting device and any thereto connected variable volume parts of the other cylinder or cylinders. The filter can then at least trap entrained dust and dirt. Moreover, a pressure relief valve, which opens, for example, at a predetermined pressure, such as 1.2 or 1.5 bar, or at least a pressure which is higher than the highest anticipated pressure in the gas collecting device, is then advantageously installed. Thus any leaking gas under pressure can escape from the pressure cylinder without causing further damage in the gas collecting device. In these embodiments, there are thus no cylinders which are not coupled with the gas collecting device.

In some embodiments, the cylinder comprises an electric, magnetic or electromagnetic drive for retraction and/or extension of the cylinder rod. These are alternative drives which do not operate with a pressure fluid, but with a direct mechanical drive. Nevertheless, volume changes will occur here too, because the cylinder rod occupies little or less space in the variable volume part.

In some embodiments, the milking robot comprises a plurality of cylinders which, with their respective said variable volume parts, are connected to one gas collecting device. It is in principle possible to connect each cylinder with its variable volume part to a separate gas collecting device. Advantageously, however, a plurality of cylinders are connected to one gas collecting device, wherein only connections are provided between the gas collecting device, such as the gas collecting bag, and the respective variable volume parts. It will be clear that this is not possible with a bellows construction from cylinder wall to piston rod, as known from the prior art.

In some embodiments, the plurality of cylinders comprise both at least one first cylinder without a respective variable pressure volume part and at least one second cylinder with a respective variable pressure volume part, wherein all first cylinders are connected with their respective said volume parts to one first gas collecting device, and in particular wherein, at the same time, all second cylinders are connected with their respective said volume parts to one second gas collecting device. In these embodiments, there are two gas collecting devices provided, wherein all variable volume parts of cylinders without variable pressure volume part are connected to a first gas collecting device, and the respective variable volume parts of cylinders with such a variable pressure volume part, which thus, in the event of leaking of the associated piston, can produce a much higher pressure, are connected to a second gas collecting device. Thus, in any event when there is leaking of a pressure cylinder, the other cylinders are safeguarded against possible overpressure.

In this embodiment, as applies in general to all embodiments, the gas collecting device has during use a smallest volume and a largest volume, wherein the difference between the smallest and the largest volume is at least equal to the sum of maximum volume changes of all variable volume parts of all cylinders connected thereto. In this context, account is advantageously taken of the respective working ranges of the cylinders. It is thus the case that when all cylinders are moved such that the variable volume part is maximally reduced and thus a maximum quantity of air or gas is ejected into the gas collecting device, that the latter assumes the largest volume. Advantageously, it is possible to choose a smaller maximum volume for the gas collecting device, specifically if the working range chosen for the milking robot is served by the cylinders such that extension of a first of all the cylinders is accompanied by a retraction of another of all the cylinders. This offers the advantage that the largest volume of the gas collecting device can be chosen smaller.

In some embodiments, the gas collecting device, and all volume parts in communication therewith, are filled with a gas, in particular air, which gas has a pressure of substantially 1 atmosphere. This air can be, for example, clean air, such as dry air. An inert gas, such as nitrogen or a noble gas or the like, can also be used. By a pressure of substantially 1 atmosphere is meant that this differs by no more than 10% from 1 atmosphere.

In some embodiments, the milking robot comprises a milking box having an entrance gate and an exit gate, as well as a robot arm for carrying out an animal-related action on a dairy animal in the milking box, such as connection of a teat cup, and wherein, in at least one of said entrance gate, said exit gate and said robot arm, a said cylinder is provided. In this embodiment are named some concrete moving components which can be moved with the aid of a cylinder. Of course, respective actuators are herein provided for the actual movement of the entrance gate, exit gate or robot arm. The actuators can in this case comprise one or more of the aforementioned actuators, such as a pneumatic or electromagnetic drive. Here it is further noted, however, that the invention can also be applicable to cylinders with associated gas collecting device according to the invention in other applications in a shed environment than a milking robot, such as a feed fence, a selection fence, etc. After all, said problem will also occur in a shed environment with other animals than dairy animals, such as pigs or other livestock reared for meat.

The invention will now be explained in greater detail with reference to the drawing, in which some embodiments are shown in schematic representation and in which.

Figure 1:
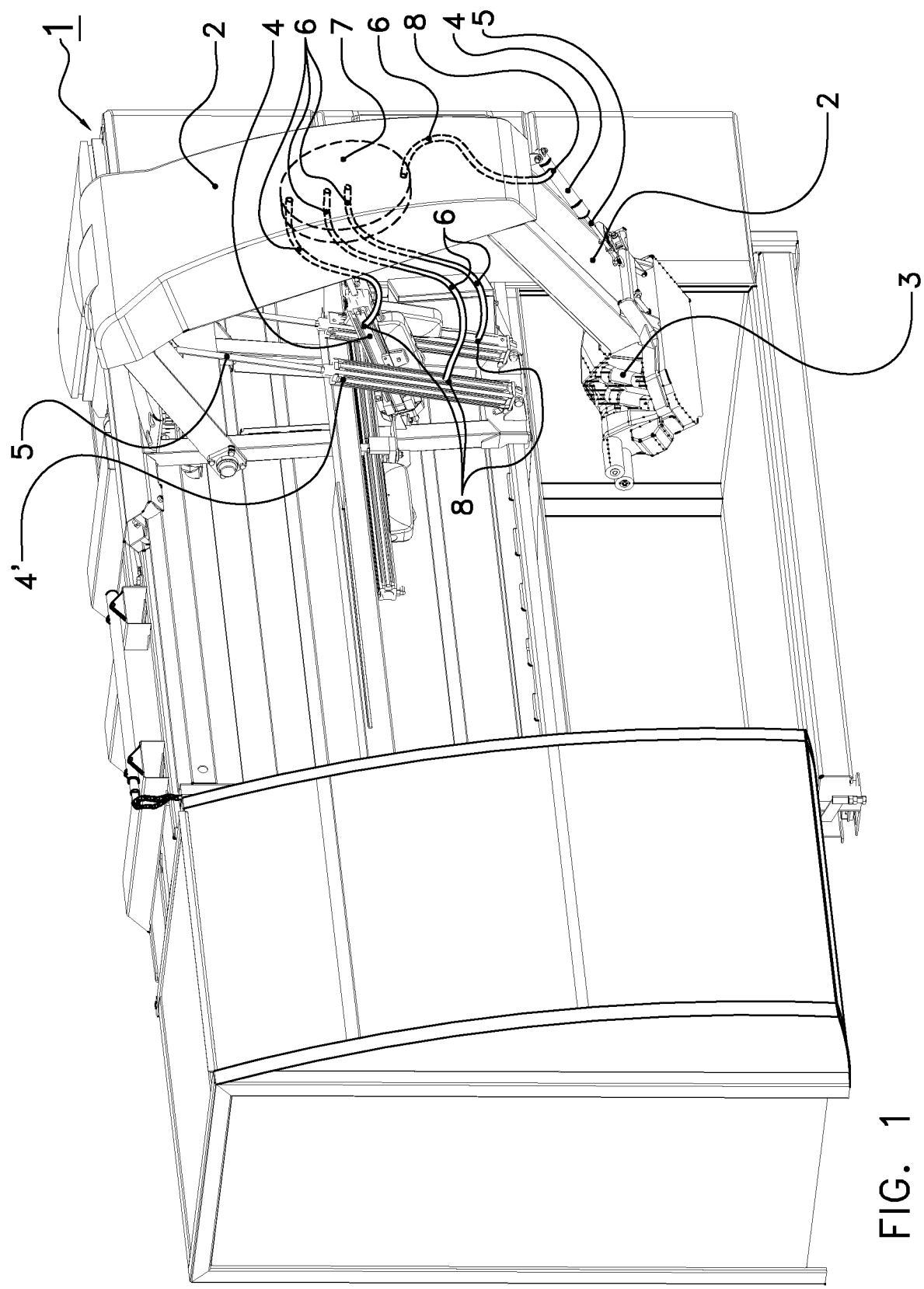
FIG. 1 shows a schematic view in perspective of a milking robot according to the invention.

FIG. 1 shows a schematic view in perspective of as milking robot 1 according to the invention. The milking robot 1 comprises robot arm parts 2, which are movable for the connection of milking cups 3 to a cow (not shown here) or another dairy animal. The movement of the arm parts 2 is effected with the aid of cylinders 4, 4' having cylinder rods 5. In addition, gas tubes 6, which run from the cylinders 4, 4' to a gas collecting bag 7, are shown. For this, respective aeration openings 8 are provided in the cylinders 4, 4'.

The milking robot 1 which is shown and is known per se comprises a robot arm, which is used, for example, to connect milking cups 3 to the teats of a dairy animal, or for other actions, such as cleaning, stimulation or after-treatment of the teats. To this end, the milking robot comprises, for example, a teat detection system (not shown in detail here). For the movement of the robot arm parts 2, actuators are provided in the form of cylinders 4, each having a cylinder rod which can be slid into and out of a variable volume part in the cylinder. With this sliding in and out, the volume of the variable volume part will change. If the variable volume part is closed off in a wholly or substantially airtight manner, the pressure in the volume part will thereby change. Not only can this have an undesirable effect on the movement of the cylinder rod, but also such a pressure difference with the environment makes it possible that gas is exchanged with the environment. In the event of an underpressure, ambient gas (whether or not aggressive or corrosive), moisture, dirt, etc. can find its way in. In the event of an overpressure (upon retraction of the cylinder rod), gas can escape, whereafter, upon extension of the cylinder rod, an underpressure can still eventually be created, with the above-described risks.

In order to alleviate this drawback, in the cylinders 4, 4' there are provided aeration openings 8, through which are placed respective gas tubes 6, which lead to a gas collecting bag 7. Thus gas exchange can occur with the flexible gas collecting bag, so that no essentially unnecessary pressure difference is created in the cylinder. At least, it is easily possible for the gas collecting bag, by means of volume enlargement, to prevent a pressure difference, or at least strongly limit this to, for example, maximally 0.2 atmosphere, or some other predetermined value. This can be determined in advance by calculation on the basis of a maximum change in volume of the variable volume part (or parts), or on the basis of experiments.

Of course, in some sorts of cylinders a part of the cylinder containing a pressure medium such as oil or air can be pressurized for the displacement of the cylinder rod, such as a pneumatic or hydraulic cylinder. In that case, it is possible that the other part of the cylinder is the previously described variable volume part. In all cases, of all cylinder volume parts of a cylinder system which are not filled with such a pressure fluid, advantageously at least one is connected with a gas tube 6 to a gas collecting bag 7. In the case of the shown cylinders 4, 4', a single-acting cylinder can be provided, wherein the weight of the robot arm part, or other moving part, movable by the cylinder can ensure the return movement. In such a case, the invention provides the possibility of an aerated volume part which is not fillable with pressure fluid. With a double-acting cylinder, that is, in principle, not the case.

Figure 2:
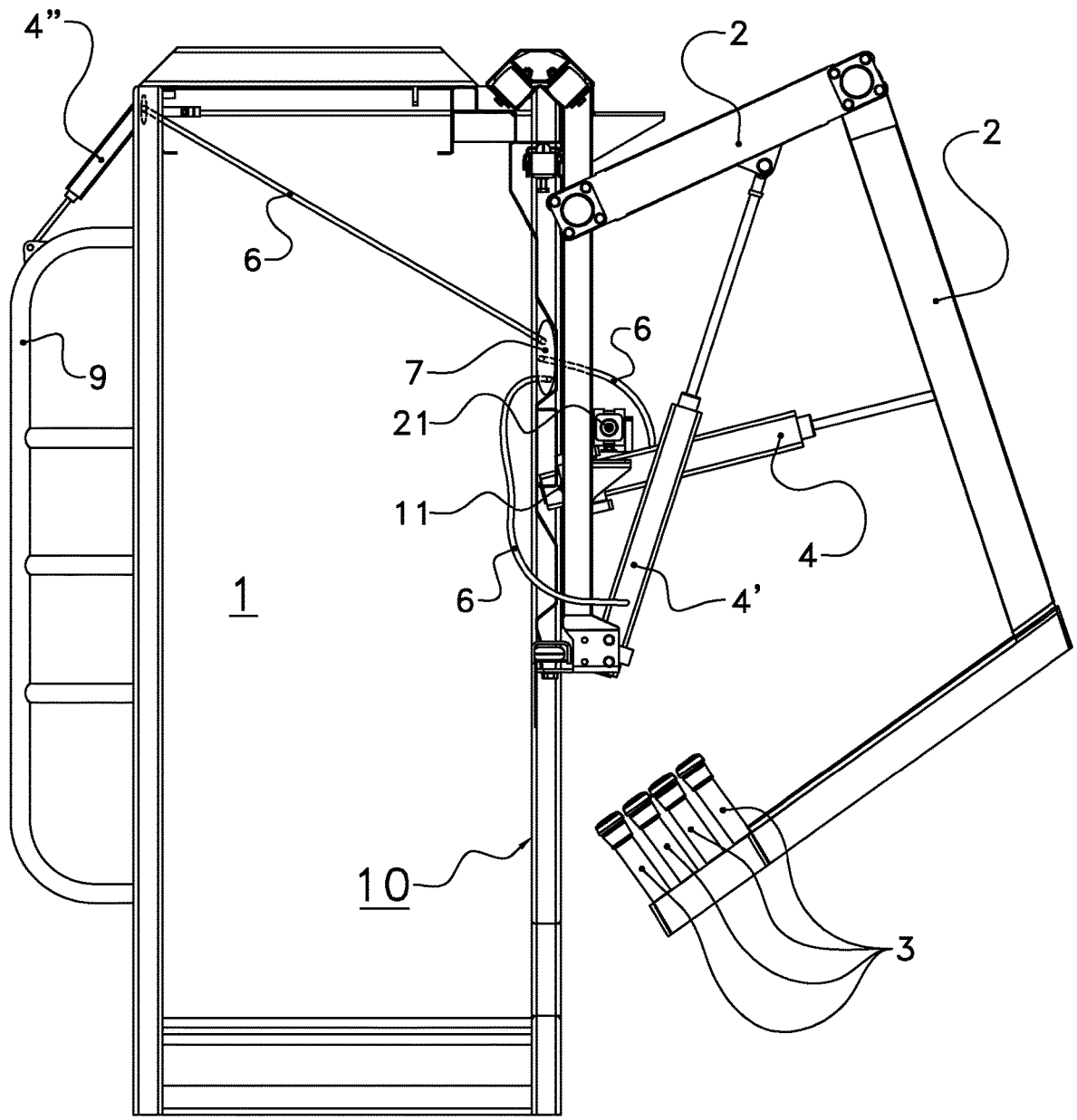
FIG. 2 shows a schematic side view of a milking robot according to the invention.

FIG. 2 shows a schematic side view of a milking robot 1 according to the invention. In the drawing as a whole, similar components are indicated with the same reference numeral. In this embodiment there is additionally shown an entrance gate 9, which is likewise operable with a cylinder 4", which, with the aid of a gas tube 5, is connected to the gas receiving bag 7. It should be clear that each cylinder which moves a component in or near the milking robot, such as also an exit gate or a movable feed trough, advantageously forms part of the gas exchange system, i.e. with the aid of a gas exchange opening and a gas tube is connected to a gas collecting bag. Note that the bag can also be a cylinder in floating state. An advantage of such a cylinder is that this can be more strongly made than a bag which is necessarily flexible. Of course, the installation in a strong casing still ensures the desired strength. The gas collecting bag 7 is here therefore installed in a frame tube 10 of the milking robot 1 and is thus well shielded from mechanical and other environmental influences.

In this embodiment, the use of a balance cylinder which can serve, for example, to broadly compensate the weight of the robot arm parts 2, whereby the drive mechanism, by virtue of the respective cylinders 4, becomes lighter, is not shown. A balance cylinder of this type can, for example, additionally be fitted to the cylinder 4'. All this will be explained in greater detail in connection with FIG. 3.

Figure 3:
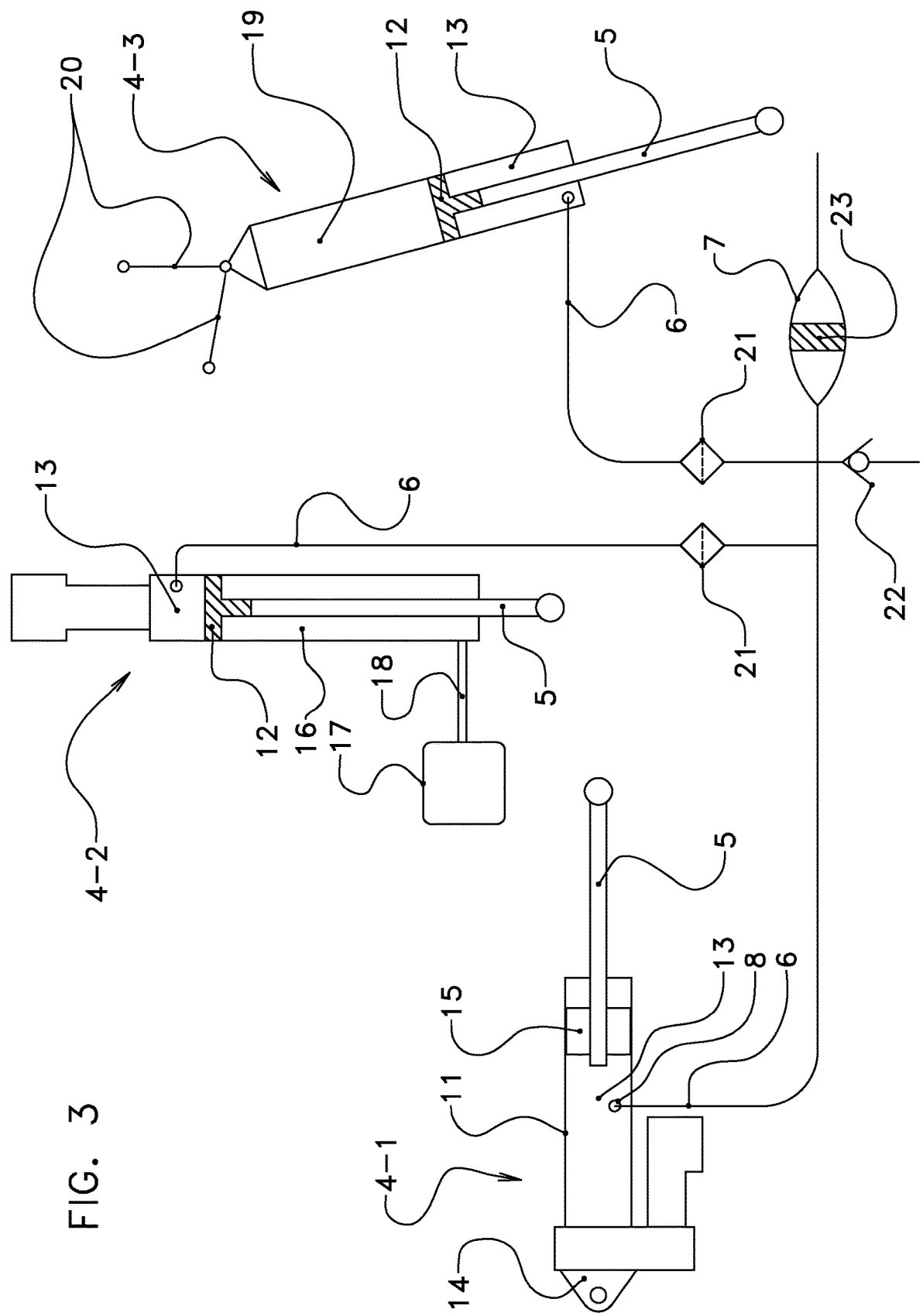
FIG. 3 shows schematically a top view of a mechanical drive of a milking robot according to the invention.

FIG. 3 shows a schematic overview of single components of a milking robot according to the invention, which serve to mechanically drive moving components of the milking robot.

For instance, 4-1 represents an electric cylinder having a cylinder wall 11, in which a cylinder rod 5 in a variable volume part 13 can slide in and out under the influence of an electromechanical drive, here comprising a power supply 14 and a motor 15. All this is here indicated very schematically and can be replaced, of course, by some other known electric cylinders.

The cylinder wall 11 comprises an aeration opening 8, to which a gas tube 6 is connected. In this case, it is of importance that the gas tube 6 is fitted wholly around, preferably directly around, the aeration opening 8 on the cylinder wall 11, wherein the gas tube 6 is thus generally fitted statically and/or immovably around the aeration opening 8. Thus the gas tube 6 cannot, by displacement relative to the cylinder wall 11, come into collision with other parts of the milking robot or wear more rapidly as a result of mechanical load.

At the other end the gas tube 6 is connected to the gas collecting bag 7, containing a block 23 made of a plastics foam, such as open-cell latex or other foam rubber or foam plastic. The collecting bag 7 is made of an elastic material, such as rubber or another synthetic material which can freely expand if gas is transferred to this bag 7. It is herein possible that, in the collecting bag 7, the gas comes to stand somewhat under a counterpressure, as a result of the inherent elasticity of the bag, yet this is advantageously as small as possible, and the gas pressure in each of the gas collecting bag 7, the gas tube 6 and the variable volume part 13 remains approximately equal to ambient pressure. There is thus only a very small chance of inward leaking of ambient air, dirt, etc. Nevertheless, a leak can occur, whereby the bag slowly deflates. The block 23 can then ensure a minimum volume, so that the bag can at least partially continue to perform its function. This will be explained in greater detail in connection with FIGS. 4-6.

Upon the outward and/or inward movement of the cylinder rod 5 in the variable volume part 13 of the electric cylinder 4-1, a pressure change could take place in the variable volume part 13, should this be closed off in a wholly airtight manner. As a result of a pressure difference with the environment, dirt, moisture and/or ambient air could appear along the seal of the cylinder rod 5 and the cylinder 4-1. By, with the aid of the gas tube 6 and the gas collecting bag 7, making a pressure equalization possible, this chance has become very much smaller. Moreover, any pressure difference cannot impact negatively on the displacement of the cylinder rod 5 with the aid of the motor 15. The action of the electric cylinder 4-1 is hence improved according to the present invention.

With the aid of the electric cylinder 4-1, for example, one of the robot arm parts 2 can be displaced and/or pivoted. Also, with the aid of the hydraulic cylinder 4-2, a (different) robot arm part 2 can be displaced. For example, a hydraulic cylinder 4-2 can be used if very large forces have to be generated in order to displace a robot arm part or other moving component, where a weight compensation or other compensation cannot be used or can be used only with difficulty. Nevertheless, it will often happen that all used cylinders within the milking robot are of one and the same type.

The hydraulic cylinder 4-2 shown in FIG. 3 comprises a piston 12 with a cylinder rod 5 attached, as well as a variable pressure volume part 16 which, with a pressure fluid line 18, is connected to a hydraulic drive 17, and a variable pressure volume part 13, which, with the aid of a gas tube 6, is connected to the gas collecting bag 7. In the gas tube 6 is installed a filter 21 for filtering, for example, as yet penetrated dirt, or fluid residues of the hydraulic circuit. In this hydraulic cylinder 4-2 too, the variable volume part 13 is in principle pressureless, so that any leaking-in of gas from the environment is as far as possible prevented. Of course, there are also (many) hydraulic cylinders in which fluid is provided on both sides of the piston. These do not boast a variable volume part which is free from pressure fluid connections, and therefore fall outside the scope of this invention.

In addition, in FIG. 3 is further shown a gas spring 4-3, which, for example, can serve as weight compensation, compare the weight compensation described for FIG. 1. The gas spring 4-3 comprises, in addition to the variable volume part 13, a gas cell 19, in which is confined a quantity of gas which, upon retraction and extension of the piston 12 and cylinder rod 5, can offer counterpressure and can thus compensate the weight of moving components fastened thereto. To this end, a system of rods 20 is also provided, for example, in order to fasten the gas spring 4-3 to, and to direct it relative to, one or more robot arm parts whose weight needs to be compensated. Details of such a weight compensation are of no further importance to the invention and will hence not be explained more closely. Here too, the variable volume part 13 is connected to the gas collecting bag 7 by means of a gas tube 6 containing a filter 21. It can additionally be seen that all gas tubes 6 are connected to the same gas collecting bag 7. It is also possible to provide a plurality of gas collecting bags 7, such as a gas collecting bag for each variable volume part. Furthermore, it is possible to connect all variable volume parts 13 of cylinders in which there is also a pressure fluid, such as in this case the hydraulic cylinder 4-2 and the gas spring 4-3, to one or more gas collecting bags, and to likewise connect all variable volume parts 13 of cylinders without such a pressure fluid, such as the electric cylinder 4-1, to one or more other gas collecting bags. It is thus possible to prevent a situation in which, if a leak nevertheless occurs from a variable pressure volume part to a variable (and pressure-fluid-less) volume part 13, no compressed air or other (pressure) fluid to the other variable volume parts of other cylinders can appear.

Moreover, it is possible, as in FIG. 3, to provide a pressure relief valve 22 on one or more of the gas tubes 6. This pressure relief valve 22 is, for example, a nonreturn valve, which opens if the pressure is more than, for example, 0.2 bar or 0.5 bar above ambient pressure. In this way too, any occurring leak from a pressure fluid side, such as from a variable pressure volume part, to other components of the system can expediently be prevented.

Figure 4A:
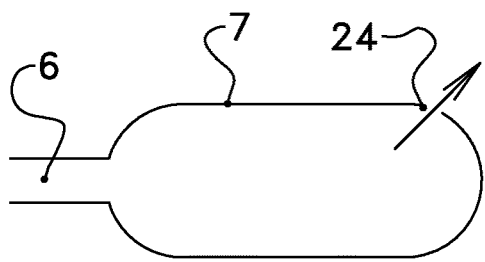
FIGS. 4a and 4b show schematically a leaking gas collecting bag according to NL2015356.
Figure 4B:
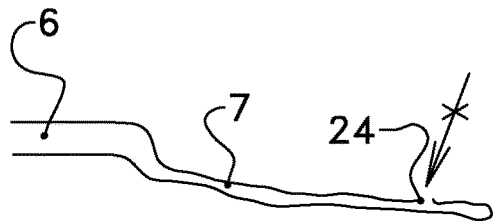

FIGS. 4a and 4b show schematically a leaking gas collecting bag according to NL2015356. The gas collecting bag 7 connected to a gas tube 6 has a leak 24, from which gas escapes, in FIG. 4a indicated with the arrow, until the bag 7 is empty (FIG. 4b). When subsequently a cylinder of the milking device (here not shown) shifts such that it requires an outflow of gas from the bag 7 via the gas tube 6, this gas flow cannot be delivered, thus no pressure can any longer be equalized, indicated with the arrow with a cross through it. Not only has the volume of the bag 9 become substantially zero, so that there is no gas available, but the bag also seals itself tight against influx of air via the leak 24. Thus the gas collecting bag 7 has become inactive.

Figure 5A:
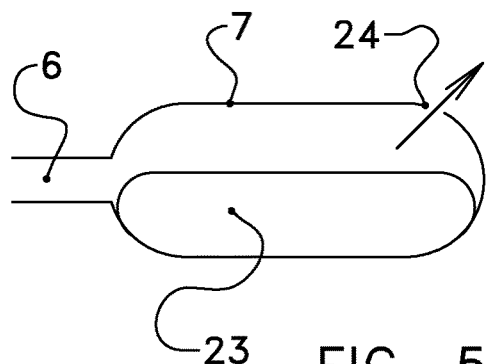
FIGS. 5a and 5b show schematically a leaking gas collecting bag according to the invention.
Figure 5B:
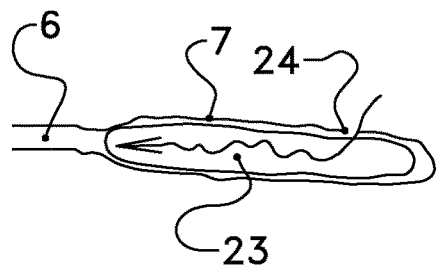

FIGS. 5a and 5b show schematically a leaking gas collecting bag according to the invention. Here, the bag 7 is a plastics foam block 23. The foam is here an open-cell foam of, for example, foam rubber or the like.

In FIG. 5a, gas also escapes via the leak 24 in the direction of the arrow, until the bag is so far empty that it presses on the block of foam 23. If gas is now requested for pressure equalization in the cylinder system of the milking device, then not only can gas present in the block 23 flow out, whereupon the block is further compressed, but air can also enter via the leak 24 and flow through the open cells of the block 23 to the gas tube 6, as indicated with the winding arrow. Note that the inherent elasticity of the block 23 and the lowest achievable underpressure determine the minimum volume of the block 23, and thus of the gas collecting device 7 as a whole. This lowest pressure is somewhat dependent on the size of the leak 24, wherein a larger leak signifies a smaller maximum underpressure, i.e. a higher absolute minimum pressure.

Figure 6A:
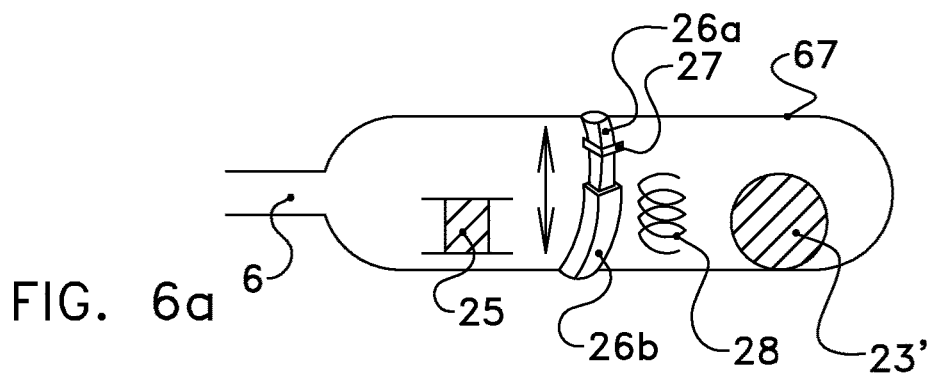
FIGS. 6a-c show schematically some examples of gas collecting devices according to the invention.
Figure 6B:
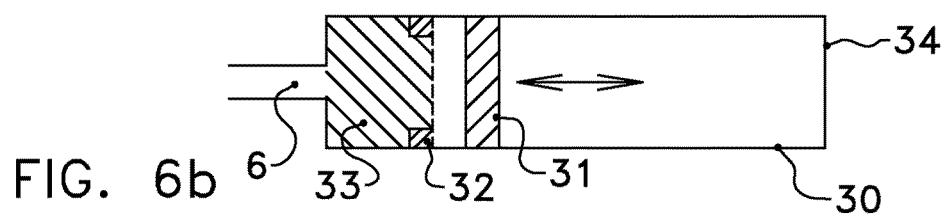
Figure 6C:
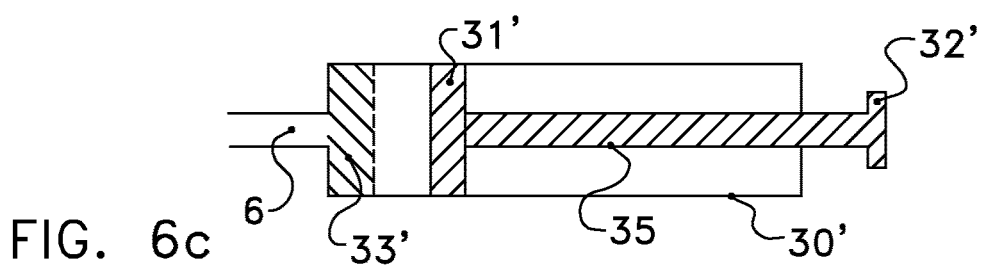

FIGS. 6a-6c show schematically some examples of gas collecting devices according to the invention.

For instance, FIG. 6a shows once again a gas collecting bag 7 having some open-holding means therein and thereon, such as a rigid body 25, a compressible exoskeleton 26a, 26b having a stop 27, a spring 28 and a ball 23' made of foam rubber. Of course, these open-holding means do not all need to be provided at the same time in a bag 7.

The rigid body 25 has the shape of a spool, and can thereby hold the bag 7 open with a minimum volume between the projecting parts of the spool. Note that this constitutes a rigid open-holding means, whose shape can in principle be freely chosen. An advantage is that the minimum volume of the gas collecting device is more accurately fixed. On the other hand, a rigid body generally offers more chance of damage.

An alternative thereto is offered by the exoskeleton, which consists of two parts 26a, 26b, which can telescope in the direction of the double arrow, the component 27 acting as a stop, which thereby determines the minimum volume of the bag 7. Because the parts 26a, 26b are provided on the outer side, they do not impede the internal gas flow in the bag 7. Furthermore, it is easier to adapt the exoskeleton, for example when fitting on a cylinder system having a different desired minimum volume.

Furthermore, the spring 28 and the ball 23' of foam rubber are some examples of resilient elements as open-holding means, which after any leak, whether or not repaired, makes the opening of the bag easier by virtue of their elasticity. A spring herein has the advantage that it internally defines a minimum volume and, at the same time, only minimally obstructs a gas flow. The ball 23' indicates that the block of resilient material can in principle have any shape. In this context, a block having an internal passage has a further advantage that it likewise impedes the gas flow between little and not at all.

FIG. 6b shows as the gas collecting device a cylinder 30 containing a piston body 31, a stop 32, which defines a minimum volume 33. A deaeration opening is indicated with 34.

In pressure equalization, the piston body 31 will move in the cylinder 30 in the direction of the double arrow. In this case, if so desired, air can enter or shift via the opening 34. If, on that side of the piston which is facing away from the opening 34, a leak is formed and gas escapes, in the event of a gas demand from the cylinder system, thus via the gas tube 6, the piston 31 will move a little bit toward the gas tube. If subsequently, after another movement in the cylinder system, gas were to be forced via the gas tube 6 into the cylinder, leak gas can escape as a consequence of the, whereby the piston 31 moves back less than expected. Thus the piston can in balance advance slowly but surely toward the gas tube. In order to prevent the piston 31 from coming wholly to bear against the gas tube 6, and hence the cylinder 34 with the piston, and the thereby confined gas volume, becoming inactive, the stop 32 is provided. This ensures that the piston 31 can advance no further than the stop, so that a minimum volume 33 always remains available for pressure equalization.

In similar fashion, FIG. 6c shows a cylinder 30' having a piston 31', which is connected via a piston rod 35 to an external stop 32' which defines a minimum volume 33'. Since the stop 32' is external and is fitted displaceably on the piston rod 35, for example with screw thread or the like—it is in this case easy to adjust the minimum volume 33', such as in dependence on the connected cylinder system and the gas volume thereof.

The shown embodiments of the invention are only meant by way of clarification and by way of limitation. The invention and its scope of protection emerge rather from the following claims.

The invention claimed is:

1. A milking robot for fully automatic milking of dairy animals, comprising at least one moving component and a cylinder configured to support a movement of the component, which cylinder has a cylinder wall having an aeration opening, as well as a cylinder rod slidable into and out of the cylinder, wherein the cylinder wall surrounds at least one variable volume part, which volume part is free from pressure fluid connections for displacement of the cylinder rod and, furthermore, is configured to remain, via said opening, substantially in pressure equilibrium with an environment of the cylinder, wherein a gas collecting device is connected to the cylinder wall around said aeration opening, which gas collecting device has a changeable volume and which, together with the variable volume part, forms an airtight gas volume, wherein the gas collecting device has a minimum volume greater than zero.

2. The milking robot as claimed in claim 1, wherein the gas collecting device comprises an open-holding means for ensuring the minimum volume in the event of a pressure reduction in the gas collecting device.

3. The milking robot as claimed in claim 2, wherein the open-holding means comprises at least one of a resilient element, in particular an open-cell block of plastics foam, a spring, or a volume which is closed off with a diaphragm and contains a gas.

4. The milking robot as claimed in claim 1, wherein the gas collecting device comprises a flexible gas collecting bag.

5. The milking robot as claimed in claim 1, wherein the gas collecting device comprises a collecting cylinder having a compressible piston.

6. The milking robot as claimed in claim 5, wherein the collecting cylinder has a stop in the piston at the minimum volume.

7. The milking robot as claimed in claim 1, wherein the gas collecting device is connected, with a tube or line around the aeration opening, in gas connection to the variable volume part.

8. The milking robot as claimed in claim 1, wherein the gas collecting device has a volume which, by supplying of gas from the volume part of the cylinder, is changeable between a smallest and a largest volume, wherein a gas pressure in the gas collecting device, when the largest volume is assumed, is equal to or less than 0.2 bar.

9. The milking robot as claimed in claim 1, wherein the cylinder is a pressure cylinder, which pressure cylinder comprises, in addition to the variable volume part, a variable pressure volume part for receiving a pressure fluid.

10. The milking robot as claimed in claim 9, wherein the pressure cylinder is a balance cylinder for supporting a weight of at least a part of a robot arm.

11. The milking robot as claimed in claim 9, wherein the milking robot further comprises a drive selected from the group consisting of a pneumatic drive, a hydraulic drive, and a hydropneumatic drive, which is configured to transfer pressure fluid to or from the pressure volume part.

12. The milking robot as claimed in claim 9, wherein the pressure fluid comprises oil or compressed air.

13. The milking robot as claimed in claim 9, wherein the pressure cylinder is a (hydro)pneumatic or hydraulic cylinder.

14. The milking robot as claimed in claim 1, wherein the cylinder comprises a drive selected from the group consisting of an electric drive, a magnetic drive, and an electromagnetic drive for retraction and/or extension of the cylinder rod.

15. The milking robot as claimed in claim 1, comprising a plurality of cylinders which are connected to one gas collecting device with their respective said variable volume parts.

16. The milking robot as claimed in claim 1, wherein the gas collecting device, and all volume parts in communication therewith, are filled with a gas which has a pressure of substantially 1 atmosphere.

17. The milking robot as claimed in claim 16, wherein the gas is air.

18. The milking robot as claimed in claim 1, further comprising a milking box having an entrance gate and an exit gate, as well as a robot arm for carrying out an animal related action on a dairy animal in the milking box, and wherein, in at least one of said entrance gate, said exit gate and said robot arm, said cylinder is provided.

19. The milking robot as claimed in claim 18, wherein the animal related action is connection of a teat cup.

20. The milking robot as claimed in claim 1, wherein the gas collecting device has a minimum volume of at least 10% of the airtight gas volume at ambient pressure.

* * * * *